(12) United States Patent
Barrenscheen et al.

(10) Patent No.: US 7,733,259 B2
(45) Date of Patent: *Jun. 8, 2010

(54) SYSTEM HAVING A SIGNAL CONVERTER DEVICE AND METHOD OF OPERATING

(75) Inventors: Jens Barrenscheen, Munich (DE); Patrick Leteinturier, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/349,790

(22) Filed: Jan. 7, 2009

(65) Prior Publication Data

US 2009/0167584 A1    Jul. 2, 2009

Related U.S. Application Data

(63) Continuation of application No. 11/697,797, filed on Apr. 9, 2007, now Pat. No. 7,492,298.

(51) Int. Cl.
*H03M 1/66* (2006.01)
(52) U.S. Cl. ...................... 341/150; 341/155
(58) Field of Classification Search .......... 341/122–170
See application file for complete search history.

(56) References Cited

U.S. PATENT DOCUMENTS

| 6,563,848 | B1 * | 5/2003 | Iwazaki ............... 372/38.02 |
| 6,703,995 | B2 * | 3/2004 | Bird et al. .............. 345/87 |
| 7,236,415 | B2 * | 6/2007 | Forbes et al. ............ 365/207 |
| 2006/0164065 | A1 * | 7/2006 | Hoouk et al. ........... 324/76.17 |

\* cited by examiner

*Primary Examiner*—Lam T Mai
(74) *Attorney, Agent, or Firm*—Dicke, Billig & Czaja, PLLC

(57) ABSTRACT

A system having a signal converter device, and a method for operating a system having a signal converter device is disclosed. One embodiment provides loading a capacitive device to a preparation voltage in a first operating phase, and loading the capacitive device to a measuring voltage in a second operating phase after the first operating phase.

25 Claims, 1 Drawing Sheet

SYSTEM HAVING A SIGNAL CONVERTER DEVICE AND METHOD OF OPERATING

CROSS-REFERENCE TO RELATED APPLICATIONS

This Utility Patent Application is a continuation of U.S. patent application Ser. No. 11/697,797, filed Apr. 9, 2007, which is incorporated in its entirety by reference.

BACKGROUND

The invention relates to a system having a signal converter device, in one embodiment, an ADC (analog-to-digital converter), and a method for operating a system having a signal converter device.

Conventional microcontroller or microprocessor systems include one or several CPUs (central processing units). The CPU(s) are connected to one or several memories, e.g., a program memory, and a data memory, etc.

The memories may be provided on the same chip, as the CPU(s) ("embedded" microcontroller or microprocessor system), or alternatively separately from the CPU(s).

The program memory e.g., may store the sequence of instructions to be executed by the CPU(s)—i.e., the program —, and the data memory e.g., respective variables, e.g., variables to be changed by the CPU(s) when executing the program.

In addition, conventional microcontroller or microprocessor systems often include one or several signal converter devices, e.g., ADCs (analog-to-digital converters).

By use of an ADC, a continuous input signal, e.g., an analog measuring voltage, a respective current signal, etc., can be converted into a digital number. The digital number then e.g., might be processed by the CPU(s).

The number of different digital numbers an ADC can produce for the allowed range of a continuous input signal is called the "resolution" of the ADC. For example, an ADC that encodes an analog measuring voltage into one of 256 different digital numbers (0.255) has a resolution of eight bits, since $2^8=256$.

As the input signal is continuous in time, it is necessary to define the rate at which new digital numbers/new discrete values are to be sampled from the input signal. The rate of new values is called the "sampling rate" or "sampling frequency" of the ADC.

ADCs may operate in accordance with a plurality of different converting methods, e.g., the parallel method, the successive approximation method, etc. (or also mixed forms thereof).

In the case of the parallel method, the input signal, e.g., the respective measuring voltage is, by using corresponding comparators, simultaneously compared with n different reference voltages, and it is detected between which two reference voltages the measuring voltage ranges. This way, the digital number pertaining to the input signal may be determined in one single step.

In the case of the successive approximation method, other than with the parallel method, the digital number pertaining to the input signal may not be determined in one single step, but in several processes, wherein only one respective position of the corresponding digital number may be determined per step.

To carry out the above conversion, a C-network, e.g., a network including a plurality of capacitors might be used.

Further, conventional ADCs may include several different input channels via which the input signals, e.g., the respective measuring voltages to be converted are supplied to the ADC.

Before carrying out the above actual conversion ("conversion phase"), a "sample phase" takes place, where the C-network is connected via one of several switches/a respective multiplexer to the respective input channel to be sampled.

During the sample phase, the C-network is loaded from e.g., 0V to the respective measuring voltage present at the respective selected input channel. The measuring voltage e.g., may be provided by a respective sensor connected to the respective input channel.

Afterwards, the C-network is again disconnected from the input channel, and the actual conversion is carried out.

In order to minimize the time needed to load the C-network to the measuring voltage, i.e., to make the sample phase as short as possible, the C-network before starting of the sample phase may be precharged, e.g., to a voltage in the middle of the expected measuring range. During the sample phase, the C-network then only needs to be loaded from the precharge voltage to the respective measuring voltage present at the respective selected input channel.

When the result of the conversion, i.e., the digital number provided by the ADC during the above actual conversion phase is outside the measuring range of the sensor providing the above measuring voltage, an error may be detected (e.g., an error due to broken wires or bad soldering connections between the respective input channel of the ADC, and the sensor).

If such an error detection is desirable, it may be advantageous to completely discharge the C-network prior to the sample phase. For this purpose, an additional switch may be provided across the C-network, which is closed, i.e., brought into an electrically conductive state to discharge the C-network prior to the sample phase, and then opened again, i.e., again brought into a non-conductive state. However, the location of the additional switch directly across the C-network might lead to undesired leakage currents, adversely influencing the accuracy of the actual conversion.

For these or other reasons, there is a need for the present invention.

SUMMARY

One embodiment provides a method for operating a system having a signal converter device including loading a capacitive device to a preparation voltage in a first operating phase, and loading the capacitive device to a measuring voltage in a second operating phase after the first operating phase.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

Figure 1:
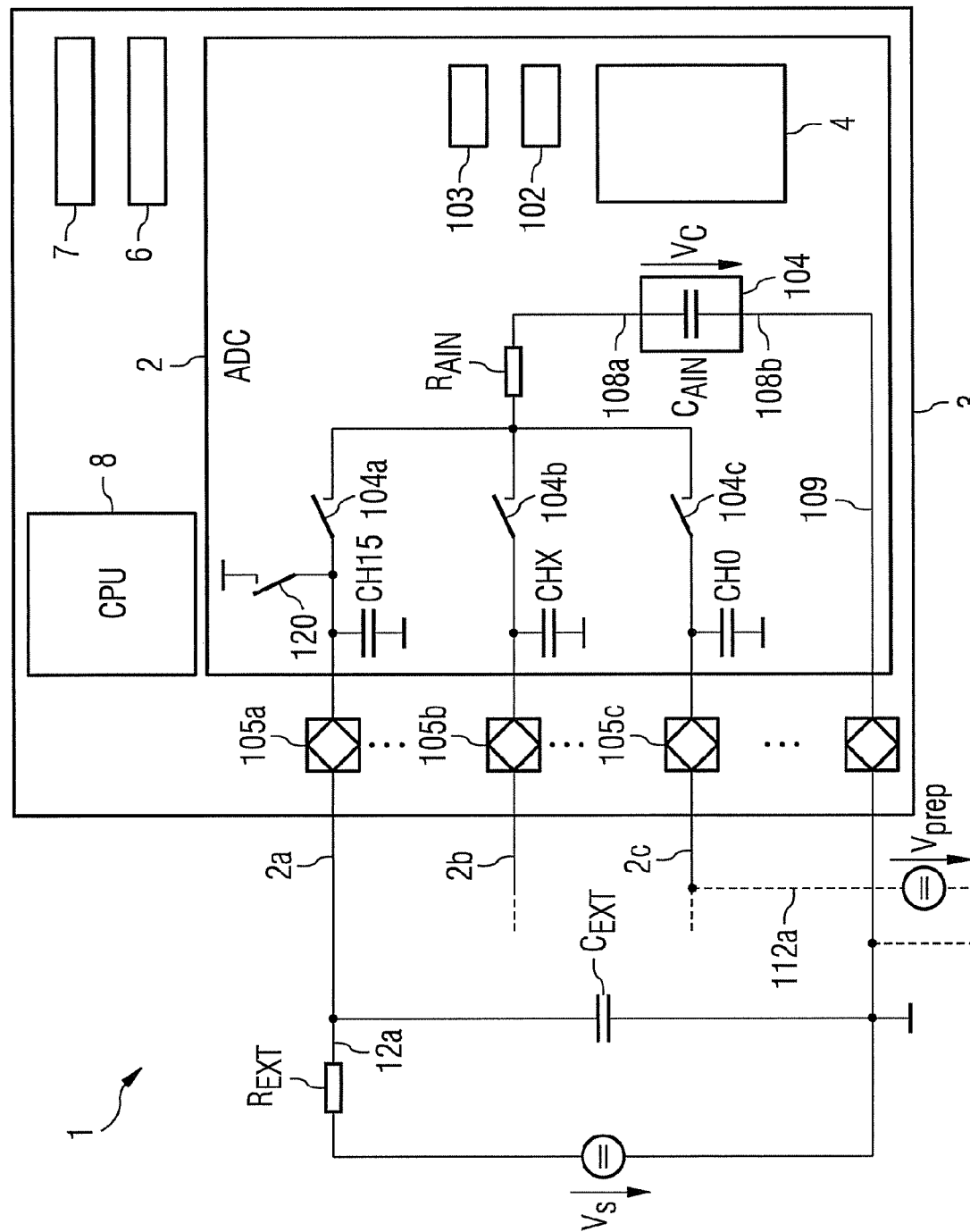
FIG. 1 illustrates a schematic, exemplary representation of an electronic system, in particular a microcontroller or microprocessor system, including an analog-to-digital converter.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the FIGURE(S) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

FIG. 1 illustrates a schematic representation of an electronic system 1, in particular a microcontroller or microprocessor system, including an analog-to-digital converter (ADC), according to one embodiment.

In one embodiment, the analog-to-digital converter 2 is arranged on a corresponding microcontroller or microprocessor 3, or a corresponding microcontroller or microprocessor chip, respectively, or any other semiconductor chip.

The analog-to-digital converter 2 may also be arranged separately from the microcontroller or microprocessor 3, in particular on a (further) chip that is provided separately from the microcontroller or microprocessor 3.

The microcontroller or microprocessor 3 may include one or a plurality of Central Processing Units 8 (CPUs), or CPU "cores", respectively, which are connected with one or a plurality of memories, e.g., a program memory 7 and a data memory 6.

In the instant embodiment, the program and the data memories 6, 7 may, for instance, be provided on one and the same chip as the corresponding microcontroller or microprocessor 3 ("embedded" microcontroller or microprocessor system), or may alternatively also be provided separately therefrom.

The program memory 7 includes in particular the sequence of instructions to be processed by the CPU(s) 8, i.e. the program (and possibly additionally corresponding data constants to be used by the CPU(s) 8 (i.e. program data)).

Contrary to this, the variables—that are possibly to be modified in particular by the CPU(s) 8 during the execution of the program—(or corresponding application data) may, for instance, be stored in the data memory 6.

The data memory 6 may e.g., be formed by one or several RAMs (RAM=Random Access Memory), in particular e.g., DRAMs (DRAM=Dynamic Random Access Memory), or SRAMs (SRAM=Static Random Access Memory).

Further, an appropriate, non-volatile memory device, e.g., an EPROM (Erasable PROM) or EEPROM (Electrically Erasable PROM), in particular e.g., a flash EEPROM, may be used as program memory 7. Alternatively, a RAM, in particular e.g., a DRAM, may be used as program memory 7.

The microcontroller or microprocessor 3, in particular: the ADC 2 may, via one or a plurality of bus systems, be connected to one or a plurality of further system modules that is/are connected to the bus system(s) and communicate with each other via the bus system(s).

The microcontroller or microprocessor system 1 illustrated in FIG. 1 may, for instance, be used in a motor vehicle, e.g., for controlling distributed electrical and/or mechanical systems (e.g., for controlling motors, e.g., for electric window lifts and side mirrors, for adjusting the lower-beam headlamp, for managing sensor information to control the air conditioning system, the seating position, etc.).

The microcontroller or microprocessor 3 may, for instance, be an 8-bit, 16-bit, or 32-bit microcontroller, or any other microcontroller or microprocessor or DSP.

By using the analog-to-digital converter 2, an analog input signal, e.g., a corresponding measuring voltage—transmitted, for instance, via an external analog line 12a, and originating e.g., from one of the above-mentioned system modules, e.g., a respective sensor, and supplied to the analog-to-digital converter 2 via a corresponding input channel 2a, 2b, 2c—may be converted to a digital numerical value or digital number that is "understandable" for the microcontroller or microprocessor 3 or its CPU 8, respectively.

For converting the input signal to a corresponding digital number, the analog-to-digital converter 2 includes a signal converter 4 that operates, for instance, in accordance with the successive approximation method, or any other method (or mixed forms of respective methods).

In the case of the successive approximation method, the digital number pertaining to the input signal may not be determined in one single process, but in several processes, wherein only one respective position of the corresponding digital number may be determined per process.

To carry out the above conversion, a capacitive device, e.g., a C-network 104, for instance a network including a plurality of capacitors might be used, or a single capacitive element, etc. Alternatively, the capacitive device may also be formed by an S-H-device (sample and hold device), e.g., a sample and hold device with a sampling cap.

The capacitive device, e.g., the C-network 104 (in particular, a first end connection 108a thereof) may be connected via one of several switches 104a, 104b, 104c (e.g., of a respective multiplexer) to the respective input channel 2a, 2b, 2c to be sampled.

In detail, the capacitive device, e.g., the C-network 104 may be connected by a first line to a first end of a first switch 104a associated with a first input channel (here: channel 15 (CH 15)), and the other (second) end of the switch 104a may be connected via a respective second line to a chip input pad 105a associated with the first input channel (CH 15).

Correspondingly similar, the capacitive device, e.g., the C-network 104 may be connected by a third line to a first end of a second switch 104b associated with a second input channel (here: channel x (CH x)), and the other (second) end of the switch 104b may be connected via a respective fourth line to a chip input pad 105b associated with the second input channel (CH x).

Correspondingly similar, the capacitive device, e.g., the C-network 104 may be connected by respective further lines to respective first ends of respective further switches 104c associated with respective further input channels (channel 0 (CH 0), etc.), and respective other (second) ends of the respective switches 104c may be connected via respective additional lines to respective further chip input pads 105c associated with the respective further input channels (channel 0 (CH 0), etc.).

Further, a second end connection 108b of the capacitive device, e.g., the C-network 104 is connected via a line 109 to an additional input pad 105d, to which e.g.,—from externally—a respective constant voltage, e.g., reference ground, may be provided.

The chip input pads 105a, 105b, 105c, 105d, etc. may be connected via respective bonding wires to respective pins of a housing carrying the above microcontroller or microprocessor system 1/chip 1.

As results from FIG. 1, the analog-to-digital converter 2 may include a plurality of (e.g., more than three, more than five, more than ten, more than thirty, etc., e.g., 8, 16, or 32, etc.) different input channels 2a, 2b, 2c via which the input signals to be converted are supplied to the analog-to-digital converter 2.

For storing the digital numbers generated by the signal converter 4, one or a plurality of (result) registers 102 are provided.

Before carrying out the actual conversion by the above signal converter 4 ("conversion phase"), a "sample phase" takes place.

As will be described in further detail below, the "sample phase" may include two or more separate sub-phases, e.g., a first sample sub-phase (here: a respective sample preparation phase), and a second sample sub-phase. Alternatively, as also will be described in further detail below, the first sample sub-phase (sample preparation phase) may be omitted.

During the first sample sub-phase, the C-network 104 may be connected via the respective switch 104a, 104b, 104c of the above switches to the respective input channel 2a, 2b, 2c to be sampled. In further detail, at the beginning of the first sample sub-phase, the respective switch (e.g., the switch 104a, etc.) of the associated input channel (e.g., the input channel 2a) may be closed, such that the C-network 104 is electrically conductively coupled to the respective associated input pad (e.g.: the chip input pad 105a). Further, at the end of the first sample sub-phase, the respective switch (e.g., the switch 104a, etc.) of the associated input channel (e.g., the input channel 2a) may be opened again, such that the C-network 104 is electrically decoupled from the respective associated input pad (e.g.: the chip input pad 105a)—alternatively, the switch 104a may stay closed (see below). During the whole first sample sub-phase—and before and after the first sample sub-phase, also —, the further switches associated with the above further input channels (e.g., the switches 104b, 104c, etc.) may stay open (see below).

During the first sample sub-phase, it is not the actual measuring voltage (e.g.: a voltage Vs) e.g., originating from the above sensor that is applied to the C-network 104.

Instead, for instance, a voltage of e.g., 0V (ground) may be applied to the C-network 104.

For this purpose, for one or several or all of the above input channels 2a, 2b, 2c (here: only for the first input channel 2a (CH 15), but not for the other input channels 2b, 2c) an additional switch 120 may be provided.

As is illustrated in FIG. 1, a first end of the additional switch 120 may be connected to the above second line, and hence, the chip input pad 105a associated with the first input channel 2a (CH 15), and the above second end of the switch 104a associated with the first input channel 2a (CH 15). Further, as is also illustrated in FIG. 1, the other (second) end of the additional switch 120 may be connected to a respective constant voltage, e.g., to ground (0V).

As will be described in further detail below, during the first sample sub-phase, the C-network 104 may be connected via the respective additional switch 120 associated with the respective selected input channel (here: e.g., the input channel 2a)—and the above switch 104a—to the above constant voltage, e.g., to ground. In further detail, at the beginning of the first sample sub-phase, the additional switch 120 of the associated input channel (e.g., the input channel 2a) is closed, such that the C-network 104 is electrically conductively coupled to ground. Further, at the end of the first sample sub-phase, the respective additional switch 120 of the associated input channel (e.g., the input channel 2a) is opened again, such that the C-network 104 is electrically decoupled from ground.

As is illustrated in FIG. 1, the additional switch 120 is provided on the microcontroller or microprocessor system 1/the above chip 1.

To ensure that during the first sample sub-phase, the actual measuring voltage (e.g.: a voltage Vs) is not applied to the C-network 104, a further switch may be used (not illustrated), e.g., a further switch also provided on the microcontroller or microprocessor system 1, which disconnects the above second end of the switch 104a (and the first end of the above additional switch 120) from the respective chip input pad 105a associated with the respective input channel during the first sample sub-phase.

For this purpose, the further switch may be opened at the beginning of the first sample sub-phase, and closed at the end of the first sample sub-phase.

Alternatively, it might be ensured by external measures that during the above first sample sub-phase the actual measuring voltage (e.g.: the above voltage Vs) is not applied to the C-network 104, e.g., by correspondingly deactivating the respective sensor during the first sample sub-phase, or by opening a switch (not illustrated) provided between the above analog line 12a, and the respective sensor (or a switch between the analog line 12a, and the chip input pad 105a), etc.

During the first sample sub-phase, the C-network 104 is discharged via the respective switch 104a, and the respective additional switch 120, such that a voltage Vc of 0V is present across the C-network 104 at the end of the first sample sub-phase.

Afterwards, the C-network 104 is again disconnected from the above ground voltage (by opening the additional switch 120 (and e.g., also the switch 104a)).

Thereafter, the above second sample sub-phase begins, where the actual measuring voltage (e.g.: the above voltage Vs) e.g., originating from the above sensor is applied to the C-network 104.

During the second sample sub-phase, the C-network 104 is connected or re-connected via the respective switch 104a, 104b, 104c of the above switches to the respective input channel 2a, 2b, 2c to be sampled.

In further detail, at the beginning of the second sample sub-phase, the respective switch (e.g., the switch 104a, etc.) of the associated input channel (e.g., the input channel 2a) is closed again, such that the C-network 104 is electrically conductively coupled to the respective associated input pad (e.g.: the chip input pad 105a).

Alternatively, as already mentioned above, the switch 104a may remain closed between the first and the second sample sub-phase, i.e., may not be opened at the end of the first sample sub-phase (and hence, need not be re-closed at the beginning of the second sample sub-phase).

At the end of the second sample sub-phase, the respective switch (e.g., the switch 104a, etc.) of the associated input channel (e.g., the input channel 2a) is opened, such that the C-network 104 is electrically decoupled from the respective associated input pad (e.g.: the chip input pad 105a). Further, during the whole second sample sub-phase (correspondingly similar as during the first sample sub-phase), the further switches associated with the above further input channels (e.g., the switches 104b, 104c, etc.) may stay open.

During the second sample sub-phase, as already mentioned above, and other than during the first sample sub-phase, the actual measuring voltage (e.g.: the above voltage Vs) e.g., originating from the above sensor—and not the above ground voltage—is applied to the C-network 104.

Hence, during the second sample sub-phase, the above additional switch 120 of the associated input channel (e.g., the input channel 2a)—and correspondingly similar respective further additional switches of further input channels (not provided in the present embodiment)—stay open (or are opened), such that the C-network 104 is electrically decoupled from ground voltage.

In addition, the above further switch (not illustrated) which may be provided on the microcontroller or microprocessor system 1 between the switch 104a, and the chip input pad 105a is closed (if such further switch exists), and may be opened again at the end of the second sample sub-phase.

It might be ensured by external measures that during the above second sample sub-phase the actual measuring voltage (e.g.: the above voltage Vs) is applied to the C-network 104, e.g., by correspondingly activating the respective sensor during the second sample sub-phase, or by opening the above switch (not illustrated) provided between the above analog line 12a, and the respective sensor, or the above switch (not illustrated) provided between the above analog line 12a, and the chip input pad 105a, etc.

During the second sample sub-phase, the C-network 104—provided that no error occurs (see below)—is loaded via the above analog line 12a, and the closed switch 104a, etc., such that the voltage Vc of 0V which at the beginning of the second sample sub-phase is present across the C-network 104 raises to the above voltage Vs provided by the above sensor (i.e., the measuring voltage present at the respective selected input channel 2a).

Should, however, e.g., a wire between the sensor and the microcontroller or microprocessor system 1 be broken (e.g., the above analog line 12a), or should there be bad soldering connections between the respective input channel 2a, and the sensor, etc., the C-network 104 is not loaded to the above measuring voltage Vs, but, e.g., may essentially stay at the value of the first sub-phase, e.g., may essentially stay at 0V (ground), or the respective reference voltage.

The length of the first and second sample sub-phases may be essentially identical, or also may be substantially different (e.g., the first sample sub-phase may be longer, than the second sample sub-phase, or vice versa).

In one embodiment, the additional switch 120 associated with the above first input channel 2a may be used to discharge the C-network 104 in a respective first sample sub-phase also when an input channel other than the first input channel 2a for which the additional switch 120 is provided is to be sampled (e.g., the second input channel 2b (CH x)). In this case, during the first sample sub-phase, the above switch 104a associated with the first input channel 2a, and the additional switch 120 is closed (such that the C-network 104 discharges). Thereafter, in a respective second sample sub-phase following the first sample sub-phase, the above switch 104a associated with the first input channel 2a, and the additional switch 120 are opened, and the switch 104b associated with e.g., the second input channel 2b (i.e., the input channel to be sampled) is closed, such that a measuring voltage applied to the chip input pad 105b associated with the second input channel 2b (i.e., the input channel to be sampled) is applied to the C-network 104. The C-network 104 is then loaded via the closed switch 104b, etc., such that the voltage Vc of 0V which at the beginning of the second sample sub-phase is present across the C-network 104 raises to the respective voltage provided at the chip input pad 105b (i.e., the chip input pad 105b associated with the selected second input channel 2b), in case there is no error (see explanation above).

After the first and second sample sub-phases, a conversion of the voltage Vc across the C-network is carried out by the signal converter 4 ("conversion phase"), and the digital number generated by the signal converter 4 in the course of the conversion may be stored in one of the above (result) registers 102.

Before or thereafter, an (automated) error detection may be carried out: When the result of the conversion, i.e., the digital number provided by the signal converter 4 during the above actual conversion is outside the measuring range of the sensor providing the above measuring voltage Vs, an error has occurred (e.g., an error due to a broken wire between the sensor and the microcontroller or microprocessor system 1 (e.g., the above analog line 12a), or due to bad soldering connections between the respective input channel 2a, and the sensor, etc.).

For this purpose, a control unit of the ADC 2, and/or the above CPU 8, etc. may compare the result of the conversion as provided by the signal converter 4 with the measuring range of the respective sensor, the lower and upper limits thereof may e.g., be stored as respective digital numbers in respective registers on the ADC 2, or in the above memories 6, 7, etc.

Should e.g., the sensor have a measuring range between 1 V and 4 V, and the result of the conversion as provided by the signal converter 4 e.g., be 0.5V only, an error is detected.

In a further embodiment, during the above first sample sub-phase, instead of a voltage of 0V (ground) a different voltage may be applied to the C-network 104, e.g., a voltage freely selectable by the user of the microcontroller or microprocessor system 1.

This "preparation" voltage Vprep (e.g., a voltage of e.g., 5V) e.g., may not be applied via the chip input pad (e.g., the chip input pad 105b) associated with the respective input channel (e.g., the input channel 2b) to be sampled, but an additional chip input pad (e.g., the above chip input pad 105c)—see e.g., the dotted line 112a illustrated in FIG. 1, and the preparation voltage Vprep supplied to the chip input pad 105c, and not to the chip input pad 105b associated with the input channel to be sampled.

During the first sample sub-phase, the C-network 104 in the further alternative embodiment is connected via the respective switch (e.g., the above switch 104c) to the above preparation voltage Vprep (applied as the above externally on the above input pad 105c, e.g., via the above line 112a). In further detail, at the beginning of the first sample sub-phase, the respective switch (e.g., the switch 104c, etc.) is closed, such that the C-network 104 is electrically conductively coupled to the respective associated input pad (e.g.: the chip input pad 105c). Further, at the end of the first sample sub-phase, the respective switch (e.g., the switch 104c, etc.) may be opened again, such that the C-network 104 is electrically decoupled from the respective associated input pad (e.g.: the chip input pad 105c). During the whole first sample sub-phase—and before and after the first sample sub-phase, also —, the further switches associated with the above further input channels (e.g., the switches 104a, 104b, etc.) may stay open.

During the first sample sub-phase, it is not the actual measuring voltage (e.g.: the above voltage Vs) e.g., originating from the above or a further sensor that is applied to the C-network 104.

Instead, for instance, the above preparation voltage Vprep of e.g., 5V is applied to the C-network 104. The preparation voltage Vprep may be chosen as a function of formerly measured values.

During the first sample sub-phase, the C-network 104 is then charged via the above switch 104c to the above preparation voltage Vprep (such that the above preparation voltage Vprep of e.g., 5V is present across the C-network 104 at the end of the first sample sub-phase).

Afterwards, the C-network 104 is again disconnected from the above preparation voltage Vprep (e.g., by opening the above switch 104c).

Thereafter, the above second sample sub-phase begins, where the actual measuring voltage (e.g.: the above voltage Vs) e.g., originating from the above or the above further sensor is applied to the C-network 104- and not the above preparation voltage Vprep.

For this purpose, the above or the above further sensor might be connected via a respective analog line (not illustrated) to the chip input pad (e.g., the chip input pad 105b) associated with the respective input channel (e.g., the input channel 2b) to be sampled.

Further, during the second sample sub-phase, the C-network 104 is connected via the respective switch (here: e.g., the switch 104b) associated with the input channel (here: the input channel 2b) to be sampled to the chip input pad (e.g.: the chip input pad 105b) associated with the input channel (here: the input channel 2b) to be sampled.

In further detail, at the beginning of the second sample sub-phase, the respective switch (e.g., the switch 104b etc.) of the associated input channel (e.g., the input channel 2b) is closed, such that the C-network 104 is electrically conductively coupled to the respective associated input pad (e.g.: the chip input pad 105b).

At the end of the second sample sub-phase, the respective switch (e.g., the switch 104b, etc.) of the associated input channel (e.g., the input channel 2b) is opened, such that the C-network 104 is electrically decoupled from the respective associated input pad (e.g.: the chip input pad 105b). Further, during the whole second sample sub-phase, the further switches associated with the above further input channels (e.g., the switches 104a, 104c, etc.) may stay open.

During the second sample sub-phase (and correspondingly similar during the first sample phase), the above additional switch or switches 120—if any—may stay open, such that the C-network 104 is electrically decoupled from ground voltage.

During the second sample sub-phase, the C-network 104— provided that no error occurs (see below)—is loaded via the respective analog line, and the closed switch 104b, etc., such that the above voltage Vprep which at the beginning of the second sample sub-phase is present across the C-network 104 raises to the above voltage Vs provided by the above or the above further sensor (i.e., the measuring voltage present at the respective selected input channel 2b).

Should, however, e.g., a wire between the sensor and the microcontroller or microprocessor system 1 be broken, or should there be bad soldering connections between the respective input channel 2b, and the above or the above further sensor, etc., the C-network 104 is not loaded to the above measuring voltage Vs, but, e.g., may essentially stay at e.g., 5V (i.e., the above preparation voltage Vprep).

The length of the first and second sample sub-phases may be substantially identical, or also may be substantially different (e.g., the first sample sub-phase may be longer, than the second sample sub-phase, or vice versa).

After the first and second sample sub-phases, a conversion of the voltage Vc across the C-network is carried out by the signal converter 4 ("conversion phase"), and the digital number generated by the signal converter 4 in the course of the conversion is stored in one of the above (result) registers 102.

Before or thereafter, an (automated) error detection may be carried out: When the result of the conversion, i.e., the digital number provided by the signal converter 4 during the above actual conversion is outside the measuring range of the sensor providing the above measuring voltage Vs, an error has occurred (e.g., an error due to a broken wire between the sensor and the microcontroller or microprocessor system 1, or due to bad soldering connections between the respective input channel 2b, and the sensor, etc.).

For this purpose, the above control unit of the ADC 2, and/or the above CPU 8, etc. may compare the result of the conversion as provided by the signal converter 4 with the measuring range of the respective sensor, the lower and upper limits thereof may e.g., be stored as respective digital numbers in respective registers on the ADC 2, or in the above memories 6, 7, etc.

Should e.g., the above further sensor e.g., have a measuring range between 0 V and 4 V, and the result of the conversion as provided by the signal converter 4 e.g., be 4.5V only, an error is detected.

Should no error detection be desired—as already mentioned above—the above first sample sub-phase may be omitted. In order to minimize the time needed to load the C-network 104 to the measuring voltage, the C-network 104 then before the above second sample sub-phase may be precharged, e.g., to a voltage in the middle of the expected measuring range (e.g., when the measuring range is between 0 V and 4 V, to a precharge voltage of e.g., 2V). For this purpose, e.g., a precharge voltage provided internally on the chip 1 may be applied across the C-network 104.

Which input channel of the above input channels 2a, 2b, 2c is to be sampled at a certain time, and/or in which register 102 the digital numbers generated by the signal converter 4 are to be stored, and/or which of the above (alternative) methods are to be used (e.g., a method with or without the above first sample sub-phase, etc.), and/or which chip input pad is to be connected to the C-network 104 during the first sample sub-phase, and/or (at least implicitly) which of the above switches are to be closed or opened at which time, and/or which measuring range a respective sensor has (e.g., for carrying out the above error detection), etc. may be freely selectable by the user of the microcontroller or microprocessor system 1, e.g., by correspondingly programming one or several control registers 103 used by the above ADC control unit and/or CPU 8 to control the above sample and/or conversion phases, etc. Thereby,—freely programmable—different settings may be applied for different input channels.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for operating a system having a signal converter device, comprising:
    loading a capacitive device to a preparation voltage in a first operating phase; and
    loading the capacitive device to a measuring voltage in a second operating phase after the first operating phase,
    wherein the preparation voltage is outside an expected measuring range of a sensor to be connected to the signal converter device.

2. The method of claim 1 further comprising providing the preparation voltage via a first switch associated with the first pin or pad; and providing the measuring voltage via a second switch associated with the second pin or pad.

3. The method of claim 2, further comprising:
closing the first switch during the first operating phase; and
closing the second switch during the second operating phase.

4. The method of claim 3, further comprising:
opening the first switch during the second operating phase; and
opening the second switch during the first operating phase.

5. The method of claim 4, wherein closing and opening the first and second switches is in response to control information stored in a control register.

6. The method of claim 1 wherein the preparation voltage is substantially 0V.

7. The method of claim 6, further comprising providing the preparation voltage via a first and a second switch associated with a first input channel.

8. The method of claim 7, further comprising:
closing the first switch and the second switch during the first operating phase.

9. The method of claim 8, further comprising:
opening the first switch during the second operating phase.

10. The method of claim 7, further comprising providing the measuring voltage via the second switch associated with the first input channel.

11. The method of claim 10, further comprising: closing the second switch during the second operating phase.

12. The method of claim 7, further comprising providing the measuring voltage via a third switch associated with a second input channel.

13. The method of claim 12, further comprising:
closing the third switch during the second operating phase.

14. The method of claim 1 further comprising:
converting a voltage across the capacitive device to a digital value in a third operating phase after the second operating phase.

15. The method of claim 14, further comprising:
comparing the voltage across the capacitive device with a predetermined voltage range in a fourth operating phase after the third operating phase to perform a plausibility check.

16. A system having a signal converter device, comprising:
a capacitive device; and
a first switch and a second switch configured to couple the capacitive device to a preparation voltage;
wherein the preparation voltage is outside an expected measuring range of a sensor to be connected to the signal converter device.

17. The system of claim 16, wherein the preparation voltage is applied by a user of the signal converter device, and is substantially 0V.

18. The system of claim 16, wherein the first switch and the second switch is configured to connect the capacitive device to the preparation voltage in a first operating phase of the signal converter device, the second switch is further configured to connect the capacitive device to a measuring voltage in a second operating phase of the signal converter device after the first operating phase.

19. The system of claim 18, wherein the first switch is further configured to disconnect the capacitive device from the preparation voltage in the second operating phase.

20. A system having a signal converter device, comprising:
a capacitive device;
a first switch associated with a first pin or pad to couple the capacitive device to a preparation voltage; and
a second switch associated with a second pin or pad different from the first pin or pad to couple the capacitive device to a measuring voltage,
wherein the preparation voltage is outside an expected measuring range of a sensor to be connected to the signal converter device.

21. The system of claim 20, wherein the first pin or pad is associated with a first input channel, and the second pin or pad is associated with a second input channel, the settings of the first and second input channels being programmable.

22. The system of claim 21, wherein the first input channel is configured to be used as measuring channel for providing a measuring voltage in a first setting of the input channels, and is configured to be used as preparation channel for providing a preparation voltage for the second input channel in a second setting of the input channels.

23. The system of claim 20, further comprising:
a memory; and
a processor in communication with the memory and the signal converter device.

24. The system of claim 20, further comprising:
a register coupled to the signal converter device.

25. A system having a signal converter device, comprising:
a capacitive device; and
first means for switching and second means for switching configured to couple the capacitive device to a preparation voltage,
wherein the preparation voltage is outside an expected measuring range of a sensor to be connected to the signal converter device.

* * * * *